3,136,805
PROCESS FOR MAKING TRIALKYL PHOSPHATES
Charles F. Baranauckas, Niagara Falls, and James J. Hodan, Tonawanda, N.Y., assignors to Hooker Chemical Corporation, Niagara Falls, N.Y., a corporation of New York
No Drawing. Filed Aug. 4, 1960, Ser. No. 47,360
16 Claims. (Cl. 260—461)

This invention relates to the preparation of trialkyl phosphates and tris (substituted-alkyl) phosphates. More particularly this invention refers to a method for the oxidation of trialkyl phosphites and tris (substituted-alkyl) phosphites with air or oxygen to yield the corresponding phosphates.

Trialkyl phosphates are used as plasticizers, gasoline additives, lubricant additives, additives for functional fluids and the like. Heretofore these phosphates were prepared by reacting phosphorus oxychloride with alcohols or by oxidizing the phosphite to the corresponding phosphate in so called "wet" techniques. For example, the phosphite was reacted with hydrogen peroxide under alkaline conditions in an aqueous medium. Techniques such as this caused hydrolysis of the phosphite and as a result the yield of trialkyl phosphate was reduced substantially. In addition close control of the pH of the reaction was necessary in order to inhibit the formation of undesired by-products.

It is an object of this invention to provide an improved method of preparing trialkyl and tris (substituted-alkyl) phophates.

A further object of the invention is to provide a method for preparing trialkyl phosphates and tris (substituted-alkyl) phosphates of high yield and purity from the corresponding phosphites.

It is another object of the invention to provide novel catalysts for use in the preparation of trialkyl and tris (substituted-alkyl) phosphates from the corresponding phosphites.

These and other objects of the invention will be apparent from the following detailed description.

It has now been discovered that trialkyl phosphates and tris (substituted-alkyl) phosphates can be obtained in excellent yields by oxidizing the corresponding trialkyl phosphite or tris (substituted-alkyl) phosphite with an oxygen-containing gas selected from the group consisting of air, oxygen, and mixtures thereof, in the presence of a catalytic amount of a metal oxide catalyst. The metal oxide catalyst markedly reduces the reaction time necessary to convert the phosphite to the corresponding phosphate.

The trialkyl phosphite and tris (substituted-alkyl) phosphite reactant may be represented by the general formula (RO)$_3$P where R is methyl, ethyl, propyl, isopropyl, butyl, pentyl, mexyl, heptyl, octyl, isooctyl, ethyl-hexyl, decyl, butoxyethyl, 2-fluoroethyl, 2-chloroethyl, 2-bromoethyl, 3-trichloroethyl, 3-trifluoroethyl, 3-tribromoethyl, benzyl, m-chlorobenzyl, m-bromobenzyl, m-fluorobenzyl, ethylphenyl, and mixtures thereof.

It is also possible to use mixed alkyl phosphites such as diethyl monomethyl phosphite, for example, to form the corresponding diethyl monomethyl phosphate.

In addition to the aforesaid phosphites there can also be used monoaryl dialkyl phosphites, monoaryl bis (substituted-alkyl) phosphites, diaryl monoalkyl phosphites, and diaryl mono (substituted-alkyl) phosphites.

The reaction is carried out by contacting an oxygen-containing gas such as oxygen, air and mixtures thereof with the phosphite in sufficient proportions to convert substantially all of the phosphite to the corresponding phosphate, in the presence of a metal oxide catalyst. Completion of the reaction can be determined by any suitable means, for example, by measuring the refractive index of a portion of the reaction mixture, or by contacting a sample of the reaction mixture with iodine whereby any phosphite present in the reaction mixture will reduce the iodine and form a colorless solution. The rate of addition of the oxygen-containing gas will vary with the oxygen content of the gas. For example, in treating triethyl phosphite with air, substantially complete conversion of the phosphite to the corresponding phosphate can be obtained when air is bubbled through the triethyl phosphite at the rate of between about ninety and fifteen hundred milliliters of air per minute per mole of triethyl phosphite. When oxygen is employed as the oxygen-containing gas the rate of addition can be reduced substantially. Any rate of addition of oxygen-containing gas that is consistent with economic operation may be employed. The oxygen-containing gas may be reacted with the trialkyl phosphite or tris (substituted-alkyl) phosphite by bubbling the gas though the phosphite by means of a sparging system or any other suitable liquid-gas contact technique.

The temperature of the reaction should be maintained between about sixty and about one hundred and eighty degrees centigrade. When temperatures above about one hundred and eighty degrees centigrade are obtained in the reaction mixture, isomerization of phosphites to phosphonates may occur, and the reaction may be difficult to control. Therefore temperatures above about one hundred and eighty degrees are not as desirable as those between sixty and one hundred and eighty degrees centigrade. Temperatures below about sixty degrees centigrade may be employed, but at these temperatures, the reaction rate is reduced significantly.

Since the reaction mixture is substantially free of water, the danger of hydrolysis of the phosphite is completely removed.

The time of reaction will depend upon the rate of addition of the oxygen-containing gas and of the type of phosphite being oxidized. Generally complete conversion of the phosphite to the phosphate can be obtained in as little as five hours, but when no catalyst is used the reaction may take as long as twenty hours or longer.

The metal oxide catalyst is added to the phosphite prior to or simultaneously with the addition of the oxygen-containing gas. Suitable metal oxide catalysts include aluminum oxide, vanadium pentoxide and mixtures thereof. Sufficient metal oxide is added to the phosphite to provide at least about 0.25% and preferably between about two and about ten percent by weight of the phosphite. However, greater or lesser amounts of metal oxide catalyst may be added if desired. After completion of the reaction the solid catalyst is separated from the liquid phosphate by filtration or other solid-liquid separation technique.

The following examples are presented to define the invention more fully without any intent of being limited thereby. All parts and percentages are by weight unless otherwise specified.

*Example 1*

The apparatus employed in this example was a two hundred and fifty milliliter, three-neck flask provided with a condenser, a thermometer, a heating mantel and a stirrer. Air was pumped through a line equipped with a rotameter which communicated with a gas dispenser positioned in the bottom of the flask. Fifty grams of triethyl phosphite and one gram of aluminum oxide were added to the flask and air was fed through the gas dispenser, while agitating the triethyl phosphite, at a rate of three hundred milliliters per minute. The triethyl phosphite was maintained at a temperature of about one hundred and twenty degrees centigrade for six hours. The residue was then filtered to separate the catalyst. A portion of the filtrate was analyzed by infrared analysis and was found to contain greater than ninety-five percent triethyl phosphate. The total residue weighed 48.5 grams which was equivalent to a yield of eighty-nine percent.

*Example 2*

Employing the apparatus of Example 1, forty grams of tris (2-butoxyethyl) phosphite and one gram of aluminum oxide were added to the flask and air was bubbled through the phosphite at the rate of three hundred milliliters per minute for about five hours. The temperature of the reaction mixture was maintained at about one hundred and twenty degrees centigrade during this period. The residue was filtered to remove the catalyst and a portion of the filtrate was analyzed. Infrared analyses indicated that the product was tris (2-butoxyethyl) phosphate. The product had a refractive index at 23.5 degrees centigrade of 1.4350, and a yield of ninety-four percent was obtained.

For purposes of comparison triisooctyl phosphite was contacted with air bubbled at a rate of three hundred milliliters per minute, in the absence of a metal oxide catalyst, at a temperature of one hundred degrees centigrade, in the apparatus of Example 1. After fourteen hours of reaction, only eighty-three percent of the phosphite was converted to the phosphate, thus demonstrating the marked improvement in the reaction rate attained by the use of our novel catalysts.

It will be recognized by those skilled in the art that various modifications within the invention are possible, some of which have been referred to above. Therefore we do not wish to be limited except as defined by the appended claims.

We claim:

1. A process for preparing a triester of phosphoric acid which comprises oxidizing a triester of phosphorous acid with an oxygen-containing gas selected from the group consisting of air, oxygen and mixtures thereof in the presence of a catalytic amount of aluminum oxide.

2. A process for preparing a trialkyl phosphate which comprises oxidizing a trialkyl phosphite with an oxygen-containing gas selected from the group consisting of air, oxygen, and mixtures thereof in the presence of a catalytic amount of aluminum oxide.

3. A process for preparing trimethyl phosphate which comprises oxidizing trimethyl phosphite with an oxygen-containing gas selected from the group consisting of air, oxygen and mixtures thereof in the presence of a catalytic amount of aluminum oxide.

4. A process for preparing triethyl phosphate which comprises oxidizing triethyl phosphite with an oxygen-containing gas selected from the group consisting of air, oxygen and mixtures thereof in the presence of a catalytic amount of aluminum oxide.

5. A process for preparing tributyl phosphate which comprises oxidizing tributyl phosphite with an oxygen-containing gas selected from the group consisting of air, oxygen and mixtures thereof in the presence of a catalytic amount of aluminum oxide.

6. A process for preparing tris(2-butoxyethyl) phosphate which comprises oxidizing tris(2-butoxyethyl) phosphite with an oxygen-containing gas selected from the group consisting of air, oxygen and mixtures thereof in the presence of a catalytic amount of aluminum oxide.

7. A process for preparing tris(2-ethylhexyl) phosphate which comprises oxidizing tris(2-ethylhexyl) phosphite with an oxygen-containing gas selected from the group consisting of air, oxygen and mixtures thereof in the presence of a catalytic amount of aluminum oxide.

8. The process for preparing a trialkyl phosphate which comprises oxidizing a phosphite represented by the formula $(RO)_3P$, where R is selected from the group consisting of methyl, ethyl, propyl, isopropyl, butyl, pentyl, hexyl, heptyl, octyl, isooctyl, ethyl-hexyl, decyl, butoxyethyl, 2-fluoroethyl, 2-chloroethyl, 2-bromoethyl, 2-trichloroethyl, 3-trifluoroethyl, 3-tribromoethyl, benzyl, m-chlorobenzyl, m-bromobenzyl, m-fluorobenzyl, ethylphenyl, and mixtures thereof, with an oxygen-containing gas selected from the group consisting of air, oxygen, and mixtures thereof in the presence of a catalytic amount of aluminum oxide.

9. The process of claim 8 wherein said oxygen-containing gas is air.

10. The process of claim 8 wherein said oxygen-containing gas is oxygen.

11. The process of claim 8 wherein the proportion of said aluminum oxide catalyst is between about two and about ten percent by weight of said phosphite.

12. A process for preparing trimethyl phosphate which comprises oxidizing trimethyl phosphite with an oxygen-containing gas selected from the group consisting of air, oxygen and mixtures thereof in the presence of aluminum oxide, the proportion of said aluminum oxide being between about two and about ten percent by weight of said phosphite.

13. A process for preparing triethyl phosphate which comprises oxidizing triethyl phosphite with an oxygen-containing gas selected from the group consisting of air, oxygen and mixtures thereof in the presence of aluminum oxide, the proportion of said aluminum oxide being between about two and about ten percent by weight of said phosphite.

14. A process for preparing tributyl phosphate which comprises oxidizing tributyl phosphite with an oxygen-containing gas selected from the group consisting of air, oxygen and mixtures thereof in the presence of aluminum oxide, the proportion of said aluminum oxide being between about two and about ten percent by weight of said phosphite.

15. A process for preparing tris(2-butoxyethyl) phosphate which comprises oxidizing tris(2-butoxyethyl) phosphite with an oxygen-containing gas selected from the group consisting of air, oxygen and mixtures thereof in the presence of aluminum oxide, the proportion of said aluminum oxide being between about two and about ten percent by weight of said phosphite.

16. A process for preparing tris(2-ethylhexyl) phosphate which comprises oxidizing tris(2-ethylhexyl) phosphite with an oxygen-containing gas selected from the group consisting of air, oxygen and mixtures thereof in the presence of aluminum oxide, the proportion of said aluminum oxide being between about two and about ten percent by weight of said phosphite.

References Cited in the file of this patent

UNITED STATES PATENTS

| | | |
|---|---|---|
| 1,284,887 | Gibbs | Nov. 12, 1918 |
| 1,694,122 | Jaeger | Dec. 4, 1928 |
| 2,059,084 | Buchheim | Oct. 27, 1936 |

OTHER REFERENCES

Zimmermann: Liebig's Annalen 175, 1–24 (1875).
Zalkind et al.: "Chem. Abst.," vol. 30, p. 3836 (1936).
Fox et al.: "The Chem. of Organic Phosphorus Compounds," July 8, 1948, p. 62.